(12) United States Patent
Kim et al.

(10) Patent No.: US 11,652,261 B2
(45) Date of Patent: May 16, 2023

(54) CYLINDRICAL TYPE SECONDARY BATTERY

(71) Applicant: LG CHEM, LTD., Seoul (KR)

(72) Inventors: Jeeeun Kim, Daejeon (KR); Namwon Kim, Daejeon (KR); Duk Hyun Ryu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 299 days.

(21) Appl. No.: 17/048,704

(22) PCT Filed: Aug. 12, 2019

(86) PCT No.: PCT/KR2019/010227
§ 371 (c)(1),
(2) Date: Oct. 19, 2020

(87) PCT Pub. No.: WO2020/111444
PCT Pub. Date: Jun. 4, 2020

(65) Prior Publication Data
US 2021/0159573 A1 May 27, 2021

(30) Foreign Application Priority Data
Nov. 27, 2018 (KR) .................. 10-2018-0148564

(51) Int. Cl.
*H01M 50/533* (2021.01)
*H01M 50/595* (2021.01)
(Continued)

(52) U.S. Cl.
CPC ..... *H01M 50/533* (2021.01); *H01M 10/0422* (2013.01); *H01M 50/40* (2021.01);
(Continued)

(58) Field of Classification Search
CPC .. H01M 50/533; H01M 50/595; H01M 50/50; H01M 10/04
See application file for complete search history.

(56) References Cited

U.S. PATENT DOCUMENTS

| | | | |
|---|---|---|---|
| 8,734,985 B2 | 5/2014 | Kim et al. | |
| 9,048,489 B2 | 6/2015 | Oh et al. | |

(Continued)

FOREIGN PATENT DOCUMENTS

| | | |
|---|---|---|
| JP | 61-218058 A | 9/1966 |
| JP | 11-26008 A | 1/1999 |

(Continued)

OTHER PUBLICATIONS

Machine Translation of: KR 10-2009-0064757, Han et al., Jun. 22, 2009.*

(Continued)

*Primary Examiner* — Kenneth J Douyette
(74) *Attorney, Agent, or Firm* — Birch, Stewart, Kolasch & Birch, LLP

(57) ABSTRACT

An electrode assembly including a negative electrode sheet, a positive electrode sheet, and a separator, wherein the separator may be disposed at an outermost side of the electrode assembly, an electrode tab disposed further inside than the separator may be attached to one of the negative electrode sheet and the positive electrode sheet, and a metal layer disposed between the electrode tab and the separator may include an adhesive material.

10 Claims, 8 Drawing Sheets

(51) Int. Cl.
*H01M 50/536* (2021.01)
*H01M 50/40* (2021.01)
*H01M 50/46* (2021.01)
*H01M 10/04* (2006.01)
*H01M 50/531* (2021.01)

(52) U.S. Cl.
CPC ......... *H01M 50/46* (2021.01); *H01M 50/531* (2021.01); *H01M 50/536* (2021.01); *H01M 50/595* (2021.01)

(56) References Cited

U.S. PATENT DOCUMENTS

| | | | |
|---|---|---|---|
| 9,299,970 | B2 | 3/2016 | Kim et al. |
| 2010/0215996 | A1* | 8/2010 | Wendling .......... H01M 50/3425 156/183 |
| 2010/0233525 | A1 | 9/2010 | Kaiduka et al. |
| 2012/0156564 | A1 | 6/2012 | Kim et al. |
| 2014/0141338 | A1 | 5/2014 | Kim |
| 2016/0248071 | A1 | 8/2016 | Jang et al. |
| 2018/0269458 | A1 | 9/2018 | Oh et al. |

FOREIGN PATENT DOCUMENTS

| | | |
|---|---|---|
| JP | 2000-150306 A | 5/2000 |
| JP | 2002-319410 A | 10/2002 |
| JP | 2009-76301 A | 4/2009 |
| JP | 2010-192462 A | 9/2010 |
| JP | 2018-60599 A | 4/2016 |
| JP | 2016-122610 A | 7/2016 |
| JP | 2016-146357 A | 8/2016 |
| JP | 2016-536770 A | 11/2016 |
| JP | 2017-216160 A | 12/2017 |
| JP | 2018-534737 A | 11/2018 |
| KR | 10-0509606 B1 | 8/2005 |
| KR | 10-2006-0124036 A | 12/2006 |
| KR | 10-2008-0057629 A | 6/2008 |
| KR | 10-2009-0027314 A | 3/2009 |
| KR | 10-2009-0064757 * | 6/2009 |
| KR | 10-2009-0132925 A | 12/2009 |
| KR | 10-2010-0102059 A | 9/2010 |
| KR | 10-1089161 B1 | 12/2011 |
| KR | 10-2014-0064168 A | 5/2014 |
| KR | 10-2016-0005421 A | 1/2016 |
| KR | 10-2017-0101632 A | 9/2017 |
| WO | WO 2009/111744 A2 | 9/2009 |
| WO | WO 2014/003382 A1 | 1/2014 |
| WO | WO 2016/168715 A1 | 10/2016 |

OTHER PUBLICATIONS

Extended European Search Report for European Application No. 19890910.3, dated Jul. 21, 2021.
International Search Report issued in PCT/KR2019/010227 (PCT/ISA/210), dated Dec. 2, 2019.

* cited by examiner

CYLINDRICAL TYPE SECONDARY BATTERY

CROSS-REFERENCE TO RELATED APPLICATIONS

This application claims priority to and the benefit of Korean Patent Application No. 10-2018-0148564 filed in the Korean Intellectual Property Office on Nov. 27, 2018, the entire contents of which are incorporated herein by reference.

TECHNICAL FIELD

The present invention relates to a cylindrical type secondary battery, and more particularly, to a cylindrical type secondary battery having an improved heat radiation function.

BACKGROUND ART

Recently, a demand for portable electronic products such as laptop computers, video cameras, portable telephones, and the like is rapidly increasing, and development of electric vehicles, energy storage batteries, robots, satellites, and the like is active, thus much research has been made on secondary batteries used as a driving power source therefor.

Such a secondary battery includes, for example, a nickel cadmium battery, a nickel hydrogen battery, a nickel zinc battery, and a lithium secondary battery. Among them, the lithium secondary battery, compared with a nickel-based secondary battery, since memory effects hardly occur, is widely used in high-technology electronic devices due to its advantages such as free charging and discharging, a very low self-discharge rate, a high operating voltage, a high energy density per unit weight, and the like.

Generally, a lithium secondary battery has a structure in which unit cells configured of a positive electrode, a negative electrode, and a separator interposed therebetween are stacked or wound, it is embedded in a case of a metal can or laminate sheet, and an electrolyte solution is injected or impregnated therein.

An electrode assembly of a positive electrode/separator/negative electrode structure configuring the secondary battery is mainly divided into a jelly roll type (wound type) and a stack type (stacked type) according to its structure. The jelly roll type is a structure obtained by interposing a separator between long sheet-type positive and negative electrodes coated with an active material and then winding it, and a stack type is a structure in which a plurality of positive and negative electrodes with a predetermined size are sequentially stacked in a state in which a separator is interposed therebetween.

Recently, in order to implement a high output and high capacity model, components used are becoming thinner, and thus secondary batteries of low resistance and high capacity are increasing. However, as the resistance is lowered and the capacity is increased, a larger current is applied for a longer time, and therefore, a problem of heat generation of the secondary battery due to discharge at a high rate or an external short circuit has become a more important problem.

In order to overcome this problem, research on a secondary battery capable of effectively controlling heat generation of an electrode tab is required.

DISCLOSURE

The present invention has been made in an effort to provide a cylindrical type secondary battery that may reduce resistance and increase stability of a battery cell.

However, the objective of the present invention is not limited to the aforementioned one, and may be extended in various ways within the spirit and scope of the present invention.

An electrode assembly according to an embodiment of the present invention includes: a negative electrode sheet, a positive electrode sheet, an electrode tab attached to one of the negative electrode sheet or the positive electrode sheet, a separator defining at an outermost side of the electrode assembly and a metal layer disposed between the electrode tab and the separator. The metal layer may include an adhesive material.

The electrode tab may include a tab body attached to the one of the negative electrode sheet or the positive electrode sheet and a protrusion extending from one end of the electrode assembly, and the protrusion may be welded to the metal layer.

The tab body and the metal layer may be connected by the adhesive material.

The electrode tab may be a negative electrode tab.

The metal layer may be a plate shaped copper foil.

The electrode tab and the metal layer may overlap at an end portion of the separator.

The metal layer may be connected to the electrode tab and the separator by an adhesive layer formed of the adhesive material.

The electrode assembly may further include an insulating tape fixing a boundary portion of the separator at an end of the separator.

The insulating tape and the metal layer may not overlap.

A device according to another embodiment of the present invention includes a cylindrical type secondary battery having the above-described electrode assembly as a power source.

According to the embodiments, by further forming a metal layer including an adhesive component on a negative electrode tab disposed outside a jelly roll type of electrode assembly, the jelly roll type of electrode assembly is fixed and a thickness of the negative electrode tab is increased to reduce resistance and diffuse heat generated when a high current is applied or when a short circuit occurs at the outside, thus it is possible to implement a cylindrical type secondary battery that may have increased stability and lifespan of a battery cell.

MODE FOR INVENTION

Figure 1:
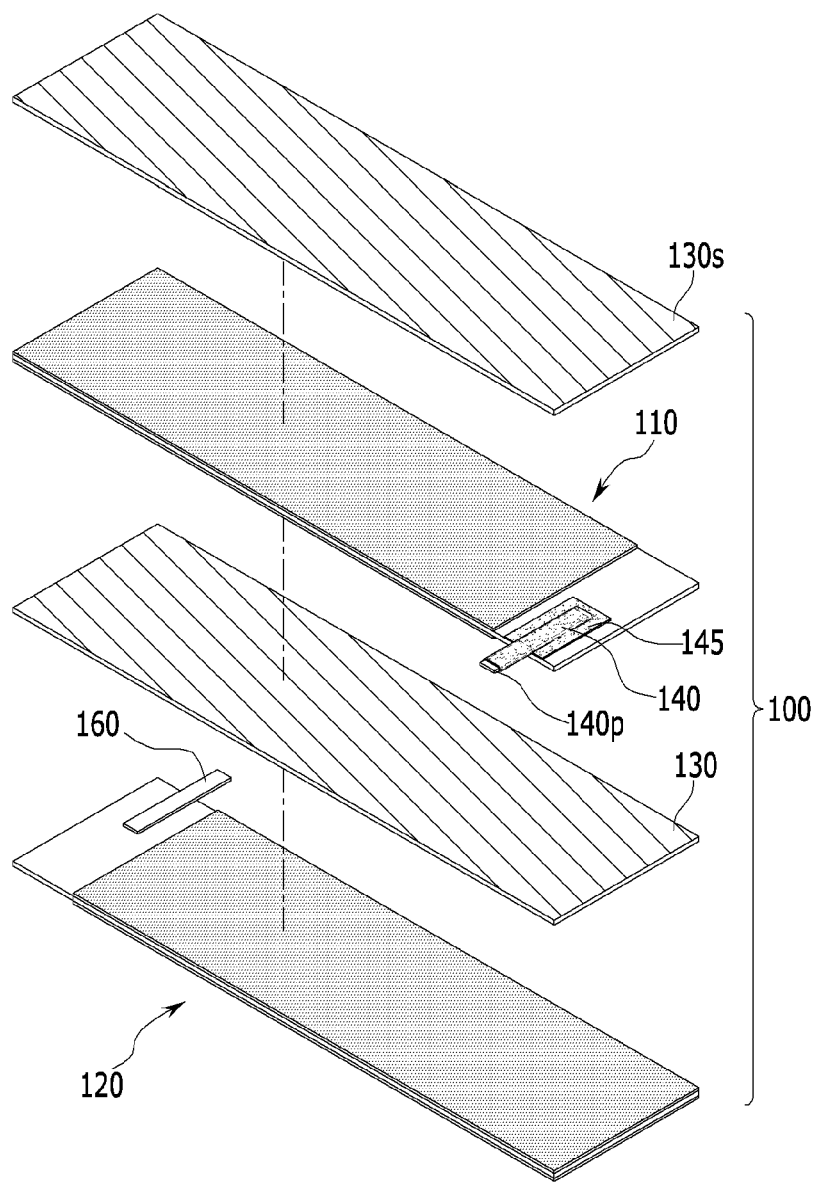
FIG. 1 is an exploded perspective view showing a state before an electrode assembly according to an embodiment of the present invention is wound.

The present invention will be described more fully hereinafter with reference to the accompanying drawings, in which embodiments of the invention are shown. As those skilled in the art would realize, the described embodiments may be modified in various different ways, all without departing from the spirit or scope of the present disclosure.

Parts that are irrelevant to the description are omitted to clearly describe the present disclosure, and like reference numerals designate like elements throughout the specification.

Further, in the drawings, the size and thickness of each element are arbitrarily illustrated for ease of description, and the present disclosure is not necessarily limited to those illustrated in the drawings. In the drawings, the thicknesses of layers, films, panels, regions, etc., are exaggerated for clarity. In the drawings, for ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" means viewing a target portion from the top, and the phrase "in a cross-sectional view" means viewing a cross-section formed by vertically cutting a target portion from the side.

Figure 2:
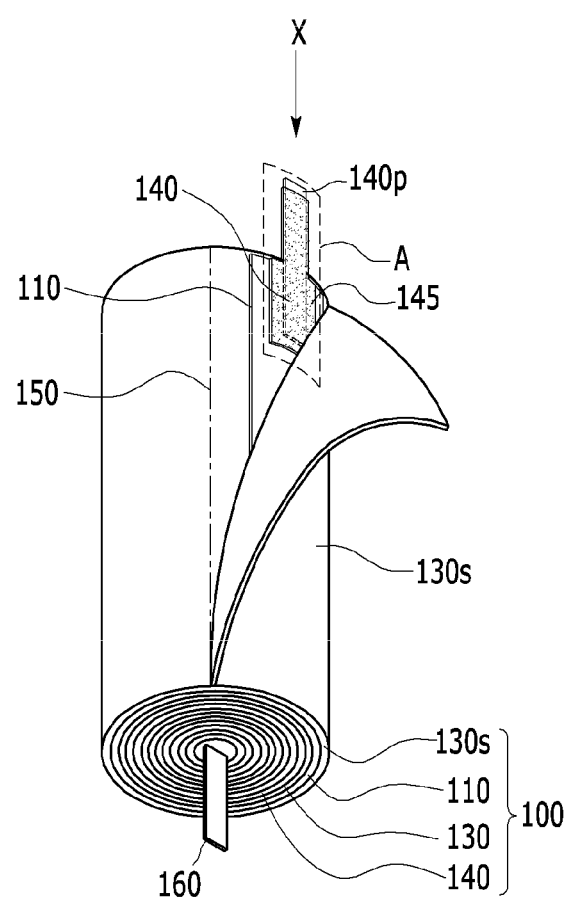
FIG. 2 is a perspective view showing a state after the electrode assembly of FIG. 1 is wound.

FIG. 1 is an exploded perspective view showing a state before an electrode assembly according to an embodiment of the present invention is wound. FIG. 2 is a perspective view showing a state after the electrode assembly of FIG. 1 is wound.

Referring to FIG. 1 and FIG. 2, a secondary battery according to an embodiment of the present invention includes an electrode assembly 100 including a negative electrode sheet 110, a positive electrode sheet 120, and a separator 130. The electrode assembly 100 may have a jelly roll type of structure. In this case, the separator 130 is interposed between the negative electrode sheet 110 and the positive electrode sheet 120, and may have a jelly roll structure formed in an order of the positive electrode sheet 120, the separator 130, and the negative electrode sheet 110 along a direction from a central portion thereof to the outside thereof, and one or more of the structures may be present. In this case, a separator 130s is disposed at the outermost side of the electrode assembly 100.

Electrode tabs may be attached to the positive electrode sheet 120 and the negative electrode sheet 110, respectively, and the electrode tabs include a negative electrode tab 140 attached to the negative electrode sheet 110 and a positive electrode tab 160 attached to the positive electrode sheet 120.

In the present embodiment, the negative electrode sheet 110 may be disposed adjacent to the separator 130 inside the separator 130s disposed at the outermost portion of the electrode assembly 100, and the negative electrode tab 140 may be attached to the negative electrode sheet 110. According to the present embodiment, a metal layer 145 may be formed between the negative electrode tab 140 and the separator 130s disposed at the outermost side. The metal layer 145 contains an adhesive material. The adhesive material may contain an acrylic material.

The metal layer 145 may be formed of a copper foil with a plate shape. The negative electrode tab 140 and the metal layer 145 may be disposed to overlap each other at an end portion of the separator 130s disposed at the outermost side. In this case, the metal layer 145 may contact the negative electrode tab 140 and the separator 130s disposed at the outermost side. The metal layer 145 may include a separate adhesive layer formed of an adhesive material to contact the negative electrode tab 140 and the separator 130s through the adhesive layer.

Although not shown, one or more positive and negative electrode tabs may be additionally attached for a high power model. In the secondary battery of the high output and high capacity model, when a large current flows within a short time due to high rate discharge, overcharge, an external short circuit, etc., a large amount of heat is generated in the electrode tab, particularly in the negative electrode tab 140 due to a current concentration. Since charging or discharging is continuously and repeatedly generated by an electrochemical reaction in the secondary battery, when the secondary battery becomes high in capacity, heat generation due to the charging and discharging is dramatically increased. Due to the heat generation, the separator 130 may be damaged to lead to an internal short circuit, which may lead to temperature variation inside the secondary battery, thereby resulting in deterioration of the secondary battery.

Particularly, in the negative electrode tab 140 having particularly high resistance among internal components of the secondary battery, heat generation thereof occurs most. In a case of a high output battery cell, a high current is applied to the battery cell, and thus, it is important to lower heat and temperature of the electrode tab because heat of the jelly roll type of electrode assembly generated at this time may be radiated in a battery case formed of a metal material through the electrode tab.

The metal layer 145 according to the present embodiment described above may effectively release heat generated in the negative electrode tab 140 to solve the heat generation problem. In addition, since the metal layer 145 contains an adhesive material, the end portion of the separator 130s disposed at the outermost side is fixed to maintain a shape of the electrode assembly 100 having a jelly roll type of structure, thereby preventing the electrode assembly 100 from being released by internal stress. In addition, since the metal layer 145 containing copper has an effect of increasing a thickness of the negative electrode tab 140, a concentration of heat may be reduced by reducing resistance thereof.

In the above description, although the negative electrode sheet 110 is described as being adjacent to the separator 130s disposed at the outermost side, the positive electrode sheet 120 may be disposed at the position at which the negative electrode sheet 110 is formed, and in this case, the negative electrode sheet 110 may be disposed at the position of the positive electrode sheet 120, so that a jelly roll structure may be formed in the order of the negative electrode sheet 110, the separator 130, and the positive electrode sheet 120 along a direction from a central position toward the outside. In other words, the positive electrode sheet 120 may be disposed adjacent to the separator 130 inside the separator 130s disposed at the outermost side. Although the application of the metal layer 145 according to the present embodiment described above is preferable because the heat is concentrated in the negative electrode tab 140, since the heat may also occur in the positive electrode tab 160, while the positive electrode sheet 120 is disposed adjacent to the separator 130 inside the separator 130s disposed at the outermost side, it is also possible to form the metal layer 145 between the positive electrode tab 160 attached to the positive electrode sheet and the outermost separator 130s. In this case, the metal layer 145 may be an aluminum foil and may contain an adhesive material.

Figure 3:
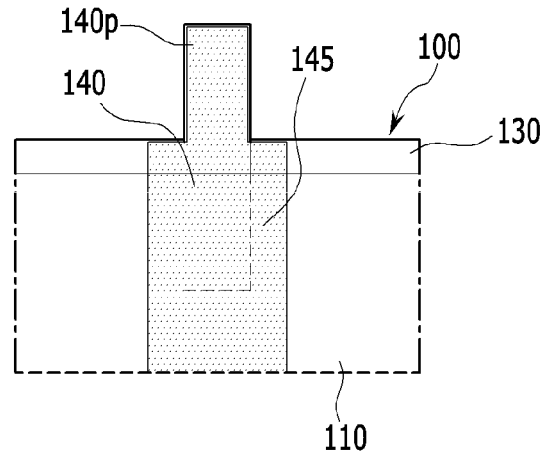
FIG. 3 is an enlarged partial plan view of a portion A of FIG. 2.
Figure 4:
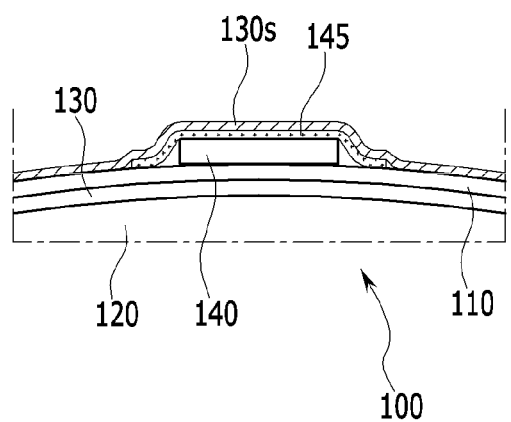
FIG. 4 is a view of the portion A viewed from an X direction of FIG. 2.

FIG. 3 is an enlarged partial plan view of a portion A of FIG. 2. FIG. 4 is a view of the portion A viewed from an X direction of FIG. 2.

Referring to FIG. 3 and FIG. 4, the negative electrode tab 140 according to the present embodiment is attached on the negative electrode sheet 110 disposed directly inside the outermost separator 130s. The negative electrode tab 140 may have a plate shape, and includes a protrusion 140p extending from one end of the electrode assembly 100. The metal layer 145 may be formed directly on the negative electrode tab 140, and the metal layer 145 may be formed to cover left and right surfaces of the negative electrode tab 140. Here, the metal layer 145 may extend not only on a tab body of the negative electrode tab 140, but also on the protrusion 140p.

In the present embodiment, the metal layer 145 may be bonded to the negative electrode tab 140 and the outermost separator 130s disposed on upper and lower surfaces of the metal layer 145 by the adhesive material included in the metal layer 145. As such, the end portion of the outermost separator 130s is fixed by the metal layer 145 containing the adhesive material to maintain a shape of the electrode assembly 100 having a jelly roll type of structure, thereby preventing the electrode assembly 100 from being released by internal stress.

The electrode assembly 100 according to the present embodiment described above may be accommodated in a battery case (not shown) such as a metal can to form a cylindrical type secondary battery.

Figure 5:
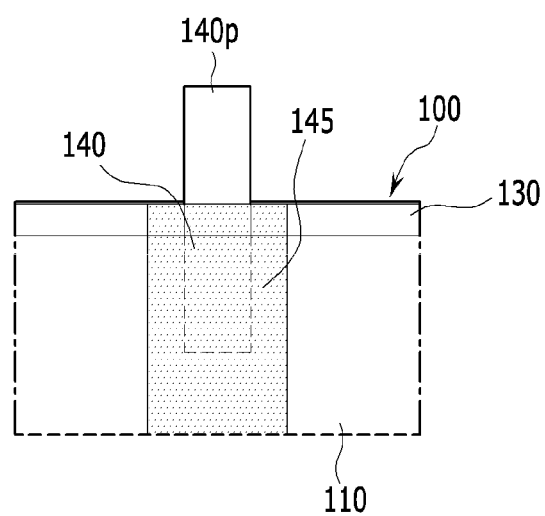
FIG. 5 is a partial plan view of an electrode assembly according to another embodiment of the present invention.

FIG. 5 is a partial plan view of an electrode assembly according to another embodiment of the present invention.

The embodiment of FIG. 5 is substantially the same as the embodiment described with reference to FIG. 3 and FIG. 4, except that the metal layer 145 is not formed on the protrusion 140p of the negative electrode tab 140, but may be formed only on the tab body of of the negative electrode tab.

Figure 6:
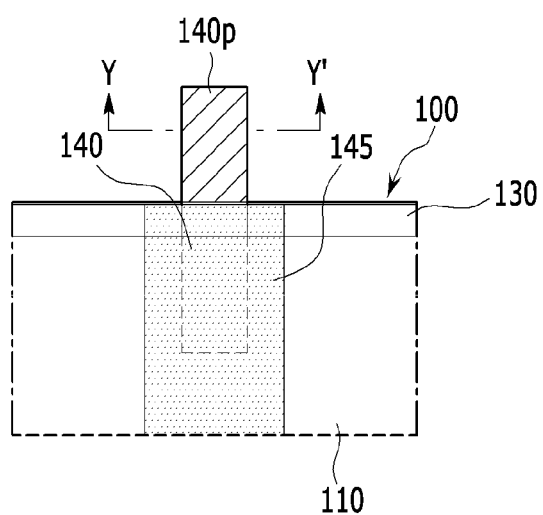
FIG. 6 is a partial plan view of an electrode assembly according to another embodiment of the present invention.
Figure 7:
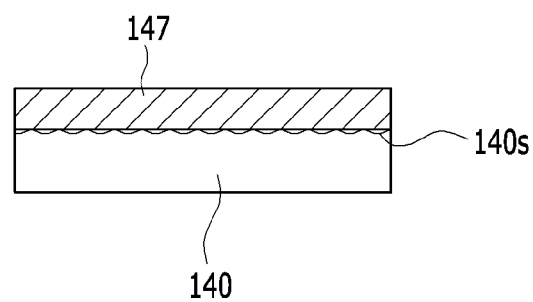
FIG. 7 is a cross-sectional view taken along line Y-Y' of FIG. 6.

FIG. 6 is a partial plan view of an electrode assembly according to another embodiment of the present invention. FIG. 7 is a cross-sectional view taken along line Y-Y' of FIG. 6.

The embodiment of FIG. 6 and FIG. 7 is substantially the same as the embodiment of FIG. 3 and FIG. 4 described above. Only differences therebetween will be described below. Except for the differences, the contents described in the embodiment of FIG. 3 and FIG. 4 are applicable to the present embodiment.

Referring to FIG. 6 and FIG. 7, the tab body of the negative electrode tab 140 and the metal layer 145 may be adhered to each other by an adhesive material included in the metal layer 145 in the tab body of the negative electrode tab 140. However, in the protrusion 140p of the negative electrode tab 140, the protrusion 147 of the metal layer 145 and the protrusion 140p of the negative electrode tab 140 may be welded to each other to form the welding portion 140s and combined. By such a welding process, the negative electrode tab 140 and the metal layer 145 are combined to be able to increase capacity. Due to the heat generation, a temperature cut-off is reached, which may result in early voltage cut-off without using sufficient capacity. However, when the negative electrode tab 140 and the metal layer 145 are combined through the welding process according to the present embodiment to increase the heat radiation effect, the early voltage cut-off may be prevented, resulting in an improvement in capacity.

Figure 8:
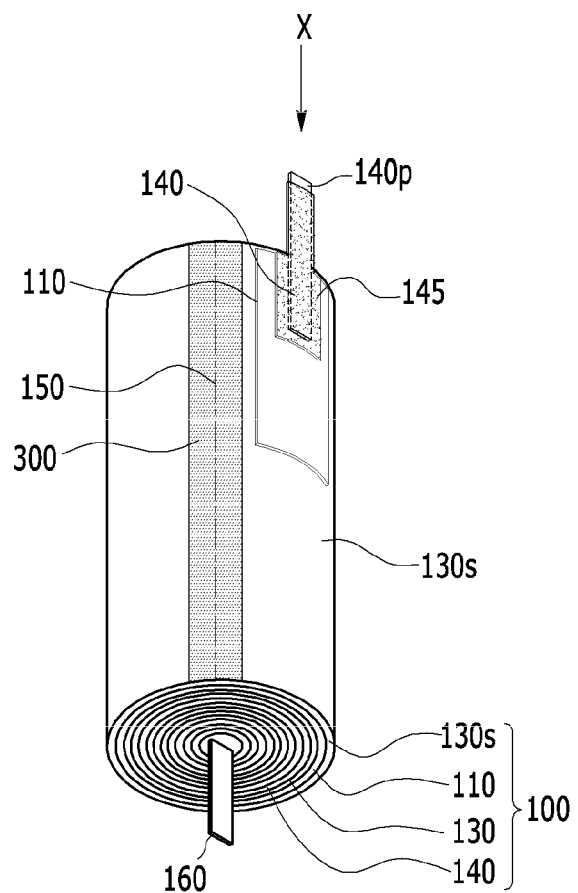
FIG. 8 is a perspective view showing an electrode assembly according to another embodiment of the present invention.

FIG. 8 is a perspective view showing an electrode assembly according to another embodiment of the present invention.

Referring to FIG. 8, an insulating tape 300 attached to an outer circumferential surface of the electrode assembly 100 included in the secondary battery according to the embodiment described with reference to FIG. 3 and FIG. 4, is included. The insulating tape 300 may serve as a finishing tape at the end of the outermost separator 130s. That is, a boundary portion 150 with the separator 130 may be fixed at the end of the outermost separator 130s. The insulating tape 300 may be disposed at the end of the outermost separator 130s so as to not overlap the metal layer 145.

The insulating tape 300 may include a thermosetting resin selected from a group of polyvinyl chloride, a mixture of a nitrile rubber and a phenol resin, an epoxy resin, polyurethane, and combinations thereof.

Since the outermost separator 130s is once again fixed by the metal layer 145 in the state in which the insulating tape 300 is attached to the outer circumferential surface of the electrode assembly 100, the shape of the electrode assembly 100 having the jelly roll type of structure can be more stably maintained.

The secondary battery described above may be applied to various devices. These devices may be applied to a transportation apparatus such as an electric bicycle, an electric vehicle, a hybrid vehicle, and the like, but are not limited thereto, and may be applied to various devices that can use the secondary battery.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 130, 130s: separator
140: negative electrode tab
140p: protrusion
145: metal layer

The invention claimed is:

1. An electrode assembly, comprising:
   a negative electrode sheet;
   a positive electrode sheet;
   an electrode tab attached to one of the negative electrode sheet or the positive electrode sheet;
   a separator defining an outermost side of the electrode assembly; and
   a metal layer disposed between the electrode tab and the separator, the metal layer including an adhesive material.

2. The electrode assembly of claim 1, wherein
   the electrode tab includes a tab body attached to the one of the negative electrode sheet or the positive electrode sheet and a protrusion extending from one end of the electrode assembly, and
   the protrusion is welded to the metal layer.

3. The electrode assembly of claim 2, wherein
   the tab body and the metal layer are connected by the adhesive material.

4. The electrode assembly of claim 1, wherein the electrode tab is a negative electrode tab.

5. The electrode assembly of claim 4, wherein the metal layer is a plate shaped copper foil.

6. The cylindrical type secondary battery of claim 1, wherein
the electrode tab and the metal layer overlap at an end portion of the separator.

7. The electrode assembly of claim 6, wherein
the metal layer is connected to the electrode tab and the separator by an adhesive layer formed of the adhesive material.

8. The electrode assembly of claim 1, further comprising:
an insulating tape that fixes a boundary portion of the separator at an end of the separator.

9. The electrode assembly of claim 8, wherein
the insulating tape and the metal layer do not overlap.

10. A device including a cylindrical type secondary battery having an electrode assembly of claim 1 as a power source.

* * * * *